Oct. 29, 1968 V. TRAVIS 3,408,136
REARVIEW VEHICLE MIRROR WITH FLAT AND CONVEX ELEMENTS
Filed May 25, 1965 2 Sheets-Sheet 2

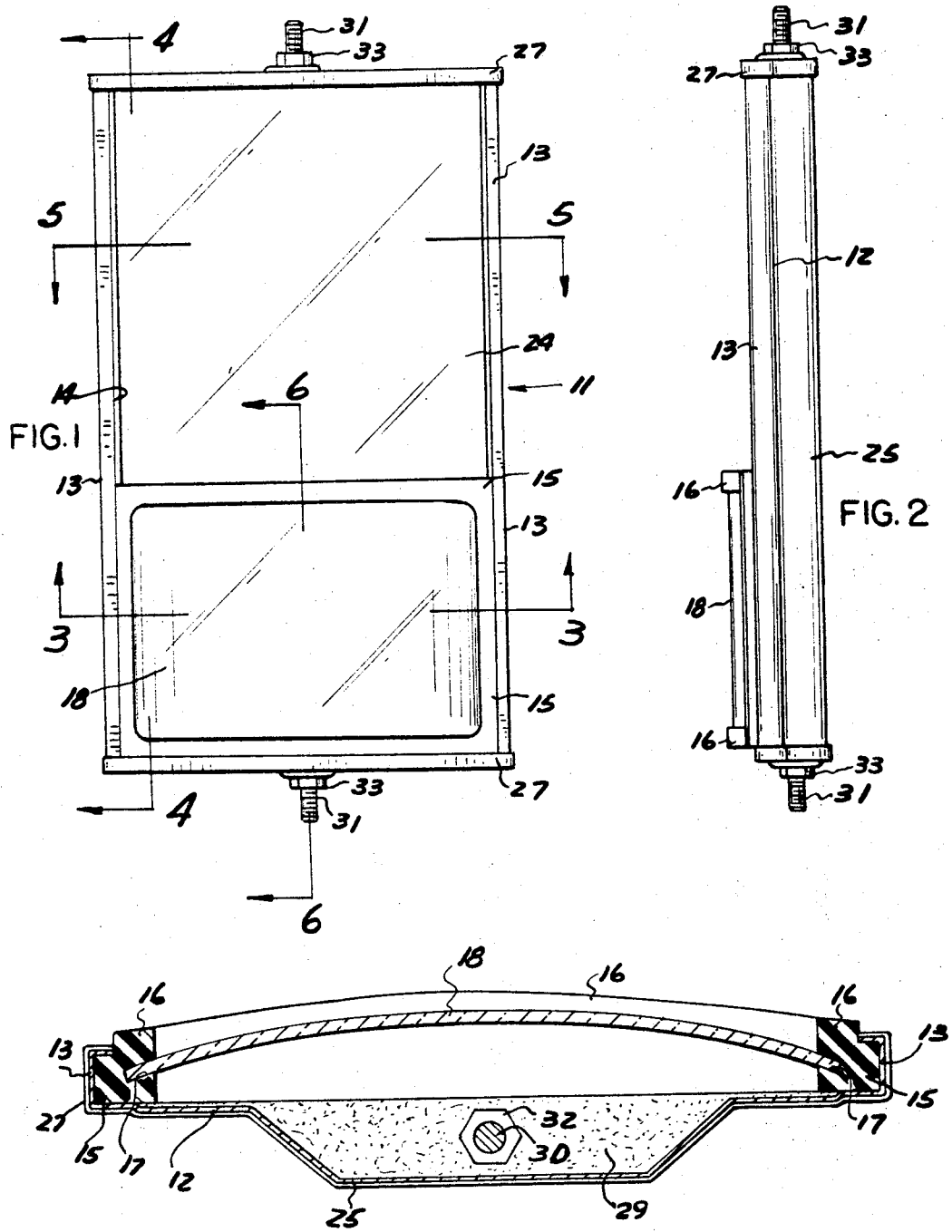

INVENTOR
VICTOR TRAVIS
BY *Cullen, Sloman & Cantor*
ATTORNEYS

United States Patent Office 3,408,136
Patented Oct. 29, 1968

3,408,136
REARVIEW VEHICLE MIRROR WITH FLAT
AND CONVEX ELEMENTS
Victor Travis, Detroit, Mich., assignor to Signal-Stat
Corporation, a corporation of New York
Filed May 25, 1965, Ser. No. 458,722
3 Claims. (Cl. 350—293)

ABSTRACT OF THE DISCLOSURE

A rear view mirror which includes an elongated shell in which are mounted a rectangular convex mirror and a flat mirror, the rectangular convex mirror being surrounded by a non-metallic frame which includes an external groove for receiving therein one edge of the flat mirror with the longitudinal edges of the flat mirror being spaced from the elongated shell by longitudinal non-metallic strips.

This invention relates to a rear view mirror, and more particularly, to a composite mirror having a flat mirror portion and a convex mirror portion, useful as an outside rear view mirror for trucks and other vehicles.

It is an object of the present invention to provide an improved rear view mirror which incorporates a simplified mounting upon a unit shell of a pair of mirrors, one being flat and the other being convex for increased visibility to the driver.

This and other objects will be seen from the following specification and claims in conjunction with the appended drawings in which:

FIG. 1 is a front elevational view of the mirror;

FIG. 2 is a side elevational view thereof;

FIG. 3 is a section taken in the direction of arrows 3—3 of FIG. 1;

Figure 4:
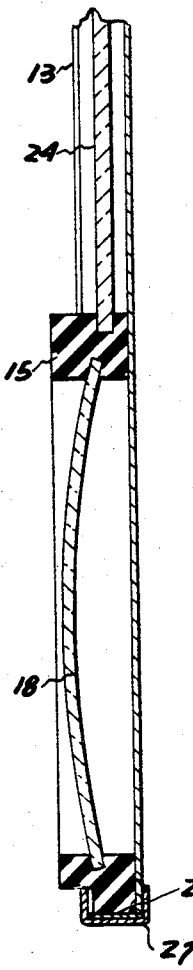
FIG. 4 is a vertical section taken in the direction of arrows 4—4 of FIG. 1.

It will be understood that the above drawings illustrate merely a preferred embodiment of the invention, and that other embodiments are contemplated within the scope of the claims hereafter set forth.

Referring to the drawings, the present rear view mirror generally indicated at 11, includes a vertically elongated hollow shell 12 constructed of aluminum or other lightweight metal, including opposed inwardly facing channels 13 at its edges which extend throughout the height of the shell and define an open front face as at 14, FIG. 1.

A hollow rectangular, flexible, non-metallic frame, preferably constructed of rubber or neoprene, is mounted within the lower portion of the shell 12 with its sides frictionally nested in channels 13 as best shown in FIGS. 1 and 3. The frame 15 has an inner portion 16 of reduced dimension which projects outwardly of the front face 14 of the shell, FIG. 3, for cooperative snug registry with the free edges of channels 13.

A continuous internal groove 17 is formed throughout the internal periphery of frame 15 and as shown in FIG. 3 is generally arcuate in cross-sectional shape. Said groove is adapted to snugly, cooperatively, and retainingly receive the peripheral edges of rectangualr convex mirror 18, which is inserted by manual flexing of the frame 15 before assembly within shell 13.

Figure 5:
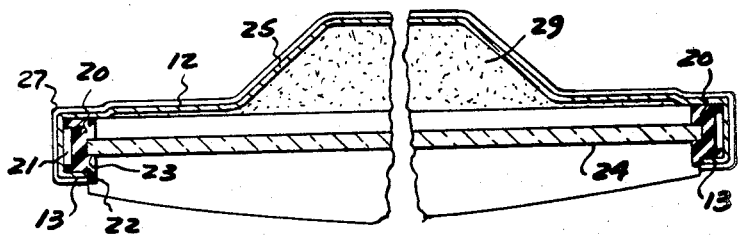
FIG. 5 is a section taken in the direction of arrows 5—5 of FIG. 1.
Figure 6:
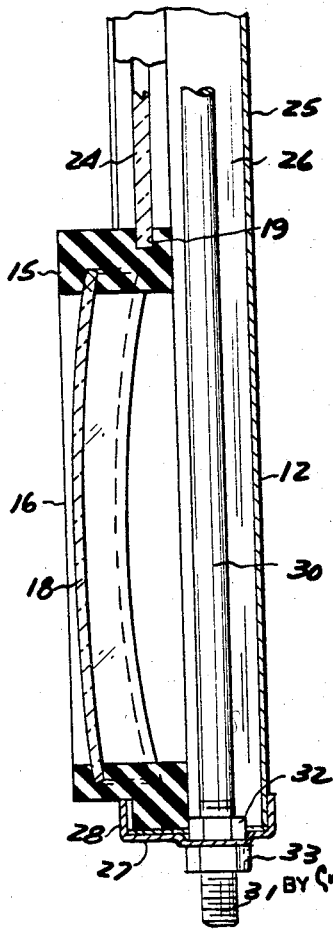
FIG. 6 is a fragmentary section on an enlarged scale taken in the direction of arrows 6—6 of FIG. 1.

An elongated external first groove 19 is formed across the top edge of frame 15 to cooperatively receive and support the lower transverse edge of flat mirror 24, FIGS. 5 and 6. In the assembly of mirror 24 within the frame there are provided opposed flexible non-metallic strips 20 of rubber or neoprene or like material, which are frictionally nested in channels 13 in the upper portion of the shell. Each of said strips include opposed internal elongated second grooves 23 adapted to cooperatively, snugly, and retainingly receive the opposed upright outer edges of flat mirror 24.

The mirror is assembled with respect to the strips 20 and the strips are then nested within channels 13. A degree of flexibility is achieved in strips 20 by the elongated grooves 21 formed in their outer surfaces. Inner portions of strips 20 are outwardly flanged at 22, FIG. 5, for cooperative registry with the inner edges of channels 13.

The rear wall of shell 12 has an upright outwardly bowed portion 25 which extends throughout the height of the shell defining chamber 26. Top and bottom cover plates 27 with continuous upturned peripheral flanges 28 project over the respective open top and bottom ends of the shell, the channels and said bowed portion.

A resilient strip 29 of cork or plastic or other material is provided upon the interior surface of cover plates 27, and particularly the top cover plate for cooperative registry with the top edge of flat mirror 24. Alternately covers 27 are made of a plastic material.

An elongated rod 30 threaded at its opposite ends at 31 is nested within chamber 26 defined by bowed portion 25 of said shell and projects centrally through the respective cover plates 27, FIG. 2. This provides a means adapted for mounting the rear view mirror by suitable bracketing, not shown, upon a truck or other vehicle, in a conventional manner.

Nuts 32 and 33 secured over threaded portions 31 of the rod 30 are arranged upon the inside and the outside of cover plates 27 for securing the rod to the cover plates and for securing the cover plates to the shell.

Having described my invention, reference should now be had to the following claims.

I claim:

1. In a rear view mirror, a vertically elongated shell; opposed inwardly facing channels at the edges of the shell throughout its height and defining an open face;

a hollow rectangular flexible non-metallic frame mounted within the lower portion of the shell with its sides frictionally nested in said channels; there being an internal continuous groove on the interior of said frame; said frame having an inner portion of reduced size projecting outwardly of said frame open face for registry with the free edges of said channels;

a rectangular convex mirror in the frame with its edges snugly nested within the frame groove; there being an elongated external first groove in said frame across its top;

opposed flexible, non-metallic strips frictionally nested in said channels in the upper portion of the shell;

there being opposed internal elongated second grooves formed in said strips;

and a flat mirror in said shell with its bottom and side edges frictionally nested and retained in said first and second grooves respectively.

2. In the rear view mirror of claim 1, top and bottom peripherally flanged cover plates snugly projected over the open ends of said shell and channels and secured thereto.

3. In the rear view mirror of claim 1, said shell having an upright rearwardly bowed portion throughout its height defining a chamber;
    top and bottom peripherally flanged cover plates snugly projected over the open ends of said shell, channels and bowed portion;
    an elongated rod threaded at its ends nested in said bowed portion rearwardly of said mirrors and projecting centrally through said cover plates, providing a means adapted for mounting upon a vehicle;
    and fasteners threaded on said rod ends for securing the rod to said cover plates and said plates to said shell.

References Cited

UNITED STATES PATENTS

| | | | |
|---|---|---|---|
| 2,849,920 | 9/1958 | Morgenstern | 248—479 X |
| 3,044,359 | 7/1962 | Zanetti-Streccia | 350—293 |
| 3,146,296 | 8/1964 | Fischer | 350—293 |
| 3,170,985 | 2/1965 | Katulich | 350—299 X |
| 3,175,463 | 3/1965 | Seashore | 350—293 |

DAVID SCHONBERG, *Primary Examiner.*

J. W. LEONARD, *Assistant Examiner.*